United States Patent
Supina et al.

(10) Patent No.: US 7,128,677 B2
(45) Date of Patent: Oct. 31, 2006

(54) TRANSMISSION ARRANGEMENTS FOR HYBRID ELECTRIC VEHICLES

(75) Inventors: Joseph Supina, Belleville, MI (US); Shailesh Kozarekar, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/276,061

(22) Filed: Feb. 13, 2006

(65) Prior Publication Data

US 2006/0116231 A1    Jun. 1, 2006

Related U.S. Application Data

(60) Division of application No. 10/747,427, filed on Dec. 29, 2003, now Pat. No. 7,086,977, which is a continuation-in-part of application No. 10/463,046, filed on Jun. 17, 2003, now abandoned, which is a continuation of application No. 09/848,038, filed on May 3, 2001, now abandoned.

(60) Provisional application No. 60/447,081, filed on Feb. 14, 2003.

(51) Int. Cl.
B60K 6/02    (2006.01)
(52) U.S. Cl. .......................................................... 475/5
(58) Field of Classification Search ................... 475/5; 180/65.2, 65.6
See application file for complete search history.

(56) References Cited

U.S. PATENT DOCUMENTS

| | | | |
|---|---|---|---|
| 5,337,848 A | 8/1994 | Bader | |
| 5,558,173 A | 9/1996 | Sherman | |
| 5,558,588 A | 9/1996 | Schmidt | |
| 5,558,589 A | 9/1996 | Schmidt | |
| 5,558,595 A | 9/1996 | Schmidt | |
| 5,643,119 A | 7/1997 | Yamaguchi | |
| 5,775,449 A | 7/1998 | Moroto et al. | |
| 5,799,744 A | 9/1998 | Yamaguchi et al. | |
| 5,839,533 A | 11/1998 | Mikami et al. | |
| 5,856,709 A | 1/1999 | Ibaraki et al. | |
| 5,916,050 A | 6/1999 | Coutant | |
| 5,931,757 A | 8/1999 | Schmidt | |
| 5,935,035 A | 8/1999 | Schmidt | |
| 5,993,350 A | 11/1999 | Lawrie et al. | |
| 6,176,808 B1 | 1/2001 | Brown et al. | |
| 6,371,878 B1 | 4/2002 | Bowen | |
| 6,428,438 B1 | 8/2002 | Bowen | |
| 6,429,541 B1 | 8/2002 | Takenaka | |
| 6,491,120 B1 | 12/2002 | Ogburn | |
| 6,502,652 B1 | 1/2003 | Rogg | |
| 6,603,215 B1 | 8/2003 | Kuang et al. | |
| 6,688,411 B1 | 2/2004 | Boggs et al. | |
| 6,692,405 B1 | 2/2004 | Minoawa | |
| 6,877,575 B1 | 4/2005 | McCarthy | |
| 2002/0165059 A1 | 11/2002 | Supina et al. | |
| 2003/0051929 A1 | 3/2003 | Raftari et al. | |
| 2003/0078126 A1* | 4/2003 | Holmes et al. ................ 475/5 |
| 2003/0183467 A1* | 10/2003 | Kozarekar .................. 188/380 |
| 2004/0006419 A1 | 1/2004 | Kimura | |
| 2004/0011576 A1 | 1/2004 | Taniguchi et al. | |
| 2004/0084323 A1 | 5/2004 | Wakuta et al. | |
| 2004/0124332 A1 | 7/2004 | Takenaka et al. | |

(Continued)

*Primary Examiner*—Sherry Estremsky
(74) *Attorney, Agent, or Firm*—David B. Kelley; Brooks & Kushman

(57) ABSTRACT

A geared, power transmission mechanism for a hybrid electric vehicle wherein multiple power flow paths are established between an engine and vehicle traction wheels and between an electric motor and the vehicle traction wheels. At least one of the power flow paths is characterized by at least two ratios.

15 Claims, 6 Drawing Sheets

U.S. PATENT DOCUMENTS

2004/0149501 A1 8/2004 Imazu et al.
2004/0166980 A1 8/2004 Supina et al.
2004/0220015 A1* 11/2004 Murakami et al. ............ 477/15
2004/0249524 A1* 12/2004 Ozeki et al. .................. 701/22

* cited by examiner

TRANSMISSION ARRANGEMENTS FOR HYBRID ELECTRIC VEHICLES

CROSS-REFERENCE TO RELATED APPLICATION

This application is a division of U.S. application Ser. No. 10/747,427, filed Dec. 29, 2003 now U.S. Pat. No. 7,086,977, which is a continuation-in-part of U.S. application Ser. No. 10/463,046, now abandoned filed Jun. 17, 2003, which claims the benefit of provisional application Ser. No. 60/447,081, filed Feb. 14, 2003. Application Ser. No. 10/463,046 is a continuation of U.S. application Ser. No. 09/848,038, filed May 3, 2001, now abandoned. Applicants claim priority to each of these previously filed applications.

BACKGROUND OF THE INVENTION

1. Field of the Invention

The present application relates to power transmission systems for use in a hybrid electric vehicle powertrain with multiple-ratio gearing.

2. Background Art

It is known design practice to provide powertrains for hybrid electric vehicles with power flow paths from an engine and an electric motor through single ratio gearing. Typically, the powertrain includes as well a generator driven by the engine. The electric motor is connected directly to the vehicle wheels through a set of transfer gears. During launch of the vehicle from a standing start, the overall gear ratio is determined by the launch torque requirements, which would demand a relatively low electric motor gear ratio.

The overall gear ratio is determined also by the maximum vehicle speed that is required. This implies that the motor gear ratio should be relatively high. The performance of the powertrain, therefore, is somewhat limited because of the requirement to strike a compromise in the performance of the electric motor in view of these dissimilar operating modes. Further, a launch of a hybrid electric vehicle with such transmission arrangements requires the electric motor to be a major source of vehicle power, especially if the engine is connected to the wheels during launch with an equivalent of an overdrive gear ratio.

SUMMARY OF THE INVENTION

The improved gearing arrangement for the hybrid electric vehicle powertrain of the present invention avoids the need for a compromise between the two operating modes for the electric motor. It will permit the traction motor and the engine and generator power sources to be connected to the output with more than one gear ratio. This provides independent control over the launch torque and the maximum vehicle speed. This is achieved by connecting the output of each power source to the wheels through independent gear sets. A low overall gear ratio is used for launch and a high gear ratio is used for higher output speeds. A gear ratio at the output side of the engine, which is equivalent to first gear, provides a good engine launch characteristic for purposes of towing or for those operating modes in which the battery has a low state-of-charge.

In the case of one gear arrangement for hybrid electric vehicle powertrains disclosed in the applications identified above, an electric motor is connected to the output shaft through a set of fixed-ratio torque transfer gears. This provides higher launch torques because of the higher torque multiplication for the torque flow path for the motor. As mentioned previously, however, this involves a compromise between the maximum output speed required and the initial acceleration torque needed for a successful vehicle launch. This compromise is avoided by the present invention.

In designs included in the present invention, a ring gear of a first planetary gear set is connected to the sun gear of a second planetary gear set in the torque flow path for the engine. The engine is connected to the carrier of the first planetary gear set and motor is drivably connected to the carrier of the second planetary gear set as well as to fixed ratio transfer gears in the torque flow path leading to the traction wheels. This planetary arrangement permits the torque flow path for the engine to be shifted between a higher ratio and a lower ratio.

The invention includes at least one embodiment in which the shifting that occurs for the engine torque flow path is achieved on a different axis that is offset with respect to the axis of the engine crankshaft.

The invention further includes at least one embodiment in which a shift in the torque flow path for the engine between a high ratio and a low ratio is achieved without the use of a second planetary gear set.

The invention further includes at least one embodiment in which the engine torque flow path and the motor torque flow path deliver torque through common multiple ratio torque transfer gears. The motor thus can provide torque to the wheels during a shift in the torque flow path for the engine.

The invention further includes at least one embodiment in which multiple ratio transmission gearing is used, together with a generator with a brake to establish torque reaction, thereby permitting torque delivery to occur using the motor as a power source in an alternate drive mode and in reverse drive. The generator drive is established when the engine crankshaft is braked, thereby permitting the vehicle to operate in an the alternate drive mode.

The invention further includes at least one embodiment in which a hybrid electric vehicle powertrain with rear wheel drive gearing comprises two planetary gear units to establish power delivery to traction wheels.

Each of the embodiments of the invention makes it possible to reduce motor size and cost while maintaining good launch characteristics. Further, in the case of some of the disclosed embodiments, the engine can be operated with the powertrain assuming an equivalent of normal first gear ratio, thereby allowing an improved towing capability.

The engine in a powertrain embodying the invention can be run at low vehicle speeds to produce good launch torque. The launch capability of the motor thus does not need to be high, which allows a battery size reduction.

The motor speed and the generator speed can be reduced when the output gears are in the low ratio. This gives greater regeneration possibilities since the engine can be shut off at high vehicle speeds.

Aside from reducing cost, the invention makes it possible to operate the motor and the generator at efficient speeds since the output ratio can be adjusted.

DETAILED DESCRIPTION OF EMBODIMENTS

Figure 1:
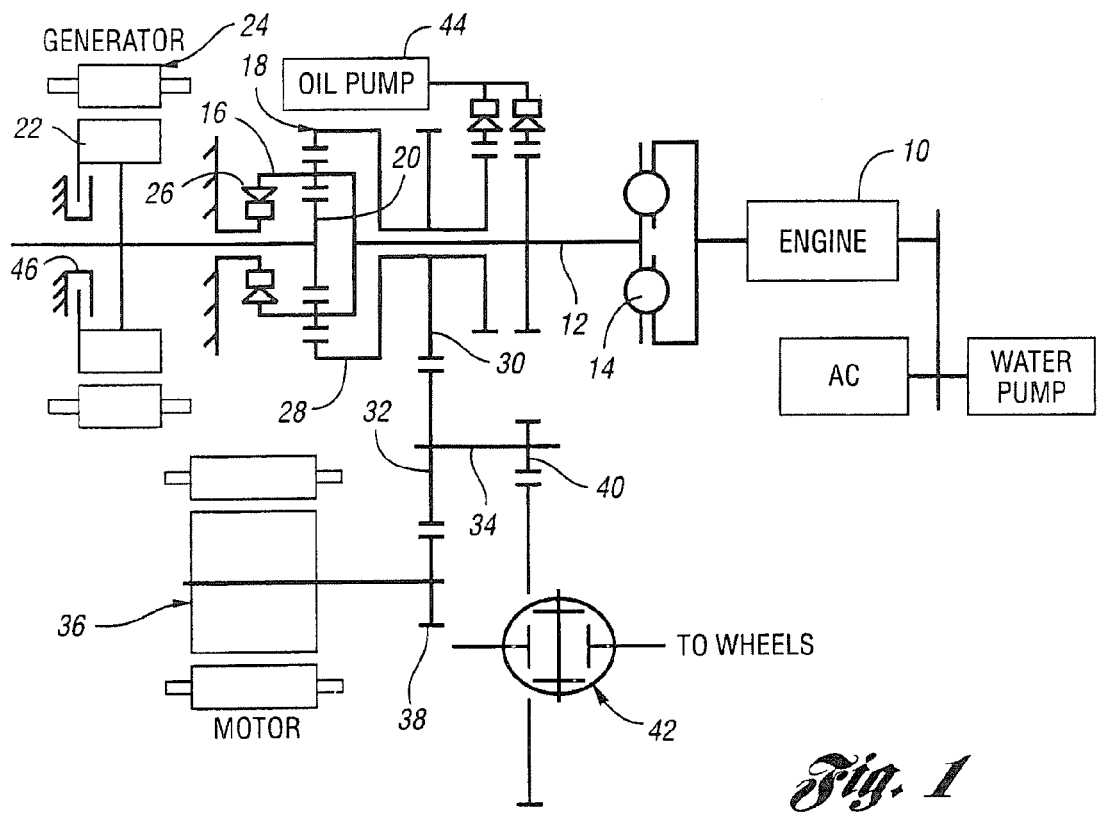
FIG. 1 is a schematic representation of a hybrid electric vehicle powertrain of the kind shown, for example, in a pending U.S. patent application, which will be identified subsequently.

FIG. 1 shows a gearing arrangement for a front wheel drive hybrid powertrain of the kind disclosed in copending patent application Ser. No. 10/605,309, filed Sep. 22, 2003, entitled "Control System for a Hybrid Electric Vehicle Powertrain." That application, which is copending with this application, is assigned to the assignee of this application. The disclosure for that application is incorporated in the disclosure for this application by reference.

Although the gearing arrangements of various embodiments of the invention are intended for front wheel drive vehicles, the invention may be used in other configurations as well, including rear wheel drive vehicles and all-wheel drive vehicles.

In FIG. 1, engine 10 is connected to transmission input shaft 12 through a mechanical spring damper 14. Shaft 12 is connected to the carrier 16 of a planetary gear unit 18. The sun gear 20 of the gear unit 18 is connected to the rotor 22 of an electric generator 24. An overrunning coupling or brake 26 prevents the carrier 16 and the engine from being driven with reverse motion while allowing the generator to deliver torque to the wheels when the engine is turned off.

The ring gear 28 of planetary gear unit 10 is connected drivably to countershaft drive gear 30 and to countershaft gear 32, thus driving intermediate shaft 34. An electric traction motor 36 is drivably connected to the intermediate shaft through gears 38 and 32. Countershaft gear 40 meshes with the ring gear of a differential-and-axle assembly 42 for the traction wheels. A transmission oil pump 44 is drivably geared to shaft 12.

When a vehicle with the transmission arrangement shown in FIG. 1 is in a highway cruise mode, the generator brake 46 is applied. This establishes a geared connection between the engine driven shaft 12 and the differential-and-axle assembly 42.

If the generator brake is applied, the power flow path is fully mechanical. The power source can be fully electrical if the vehicle is launched from a standing start with the engine off. A positive distribution of power occurs when the generator develops torque and the motor is motoring. When the motor absorbs torque and the generator is motoring, a negative power distribution occurs. In both positive power distribution and negative power distribution, part of the energy is transferred electrically and part is transferred mechanically.

Figure 2:
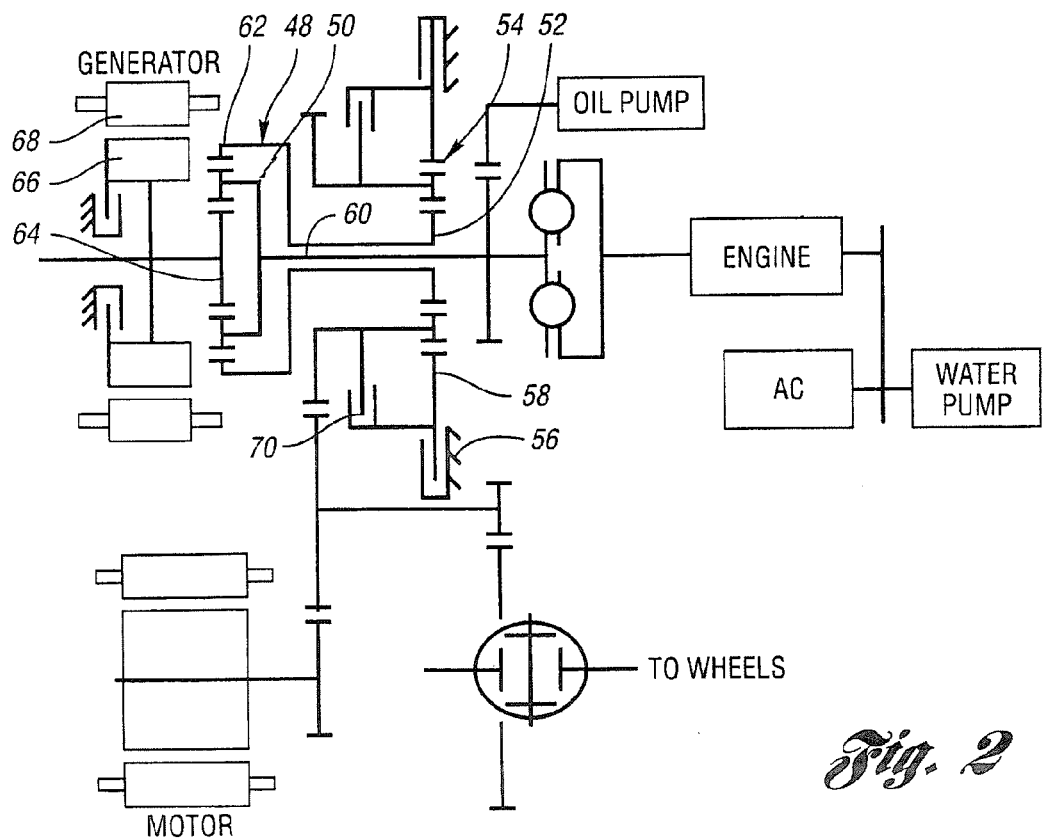
FIG. 2 is a schematic representation of a front-wheel drive transmission gearing arrangement with dual ratios.

In the embodiment of the invention shown in FIG. 2, the engine power flow path can be shifted using a planetary gear set, but the power delivery path for the motor is not shifted. In FIG. 2, there are two planetary gear units rather than a single planetary gear unit, as in the gearing arrangement of FIG. 1. The output of the first planetary gear unit, shown at 48, is the ring gear 62. Sun gear 52 of a second planetary gear unit, shown at 54, is connected to the ring gear 62. An underdrive brake 56 provides a reaction point for ring 58 of gear unit 54. The engine then is drivably connected to the output shaft with a torque multiplying ratio as the engine driven shaft 60 delivers torque through gear unit 48 to ring gear 62. Sun gear 64 of gear unit 48 is connected to the rotor 66 of the generator 68. Carrier 50 is driven by engine driven shaft 60.

A clutch 70 is located between the carrier of gear unit 54 and the ring gear 58. When the clutch 70 is engaged, the engine is connected to the output shaft with lower torque multiplication. Brake 56 and clutch 70 define a clutch and brake friction element sub-assembly.

Figure 2A:
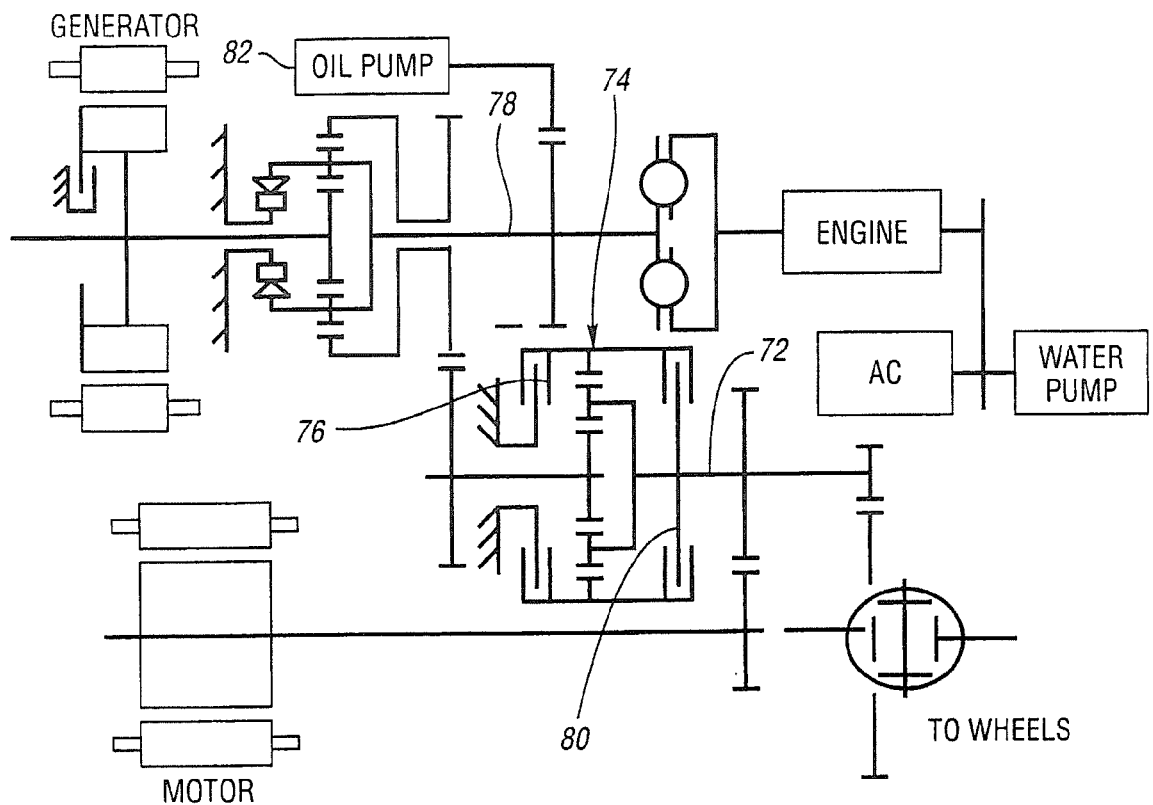
FIG. 2a is a schematic representation of a front-wheel drive gearing arrangement with a planetary gear set on an intermediate axis between the engine axis and the motor axis.

In the embodiment of FIG. 2a, the power flow path for the engine, as in the case of the gear arrangement of FIG. 2, can be shifted, but the power flow path for the motor cannot be shifted. In the case of the arrangement of FIG. 2a, however, the shifting of the power flow path for the engine occurs on a different axis; namely, the axis of countershaft 72.

A planetary gear unit 74 is mounted on the axis of countershaft 72. Gear unit 74 is comparable to gear unit 54 of the arrangement of FIG. 2. It includes a brake 76, which can be applied to establish a first gear ratio in the power flow path between engine driven shaft 78 and the countershaft 72. When the brake 76 is released and clutch 80 is applied, the gear ratio for gear unit 74 is unity. Brake 76 and clutch 80 define a clutch and brake friction element sub-assembly.

The clutch 76 can be open in a first default mode or closed in a second default mode. A default closed mode allows the engine to be started without hydraulic pressure being available from the pump 82. A default open mode requires hydraulic pressure to be developed as the motor drives the pump 82.

Figure 2B:
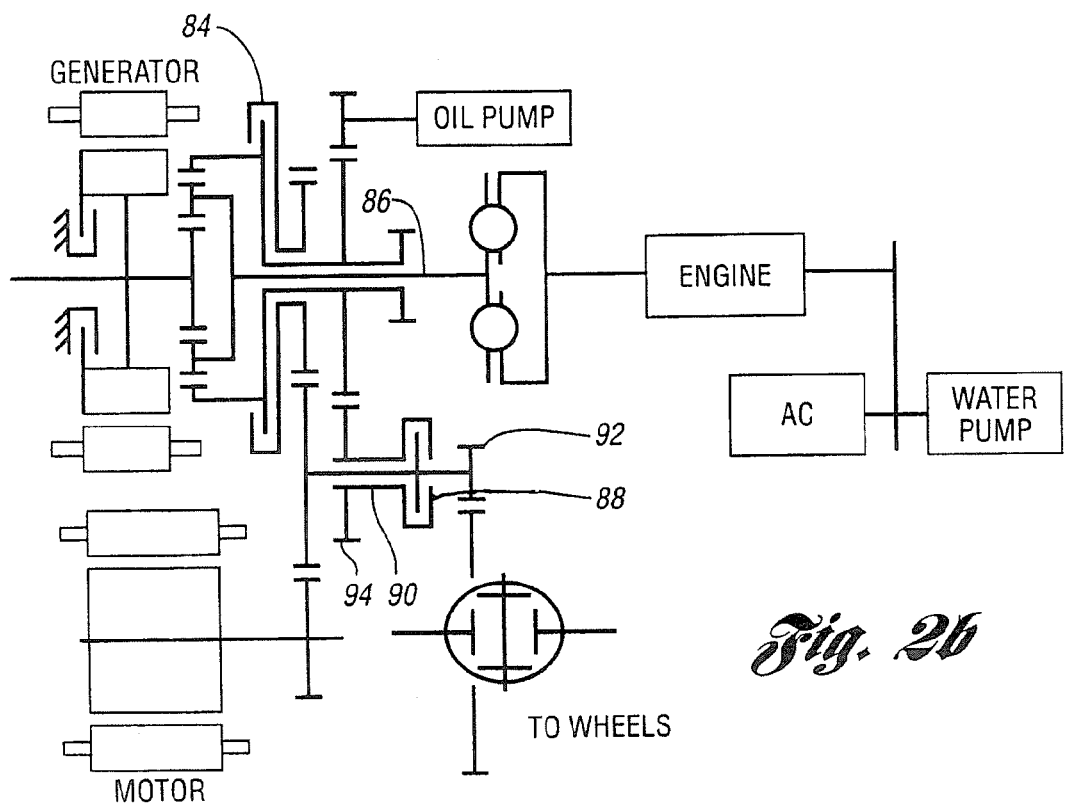
FIG. 2b is a schematic representation of a front wheel drive gearing arrangement with multiple ratios without a planetary gear unit on a third axis between the engine axis and the motor axis.

In the embodiment of FIG. 2b, the power flow path for the engine can be shifted, whereas the power flow path for the motor cannot be shifted. In the case of the arrangement of FIG. 2b, however, the power flow path for the engine can be shifted without the use of a planetary gear unit on the countershaft axis, as in the case of the gear arrangement of FIG. 2a.

In the gear arrangement of FIG. 2b, a friction clutch 84 is applied to establish a first ratio in the torque flow path for the engine driven shaft 86. When the clutch 84 is released, the engine driven shaft 86 is connected to the output shaft with a gear ratio of reduced torque multiplication. A clutch 88 on the axis of the countershaft can be applied with clutch 84 released to connect the engine to the output shaft with decreased torque multiplication. The pitch diameter of countershaft gear 92 is smaller than the pitch diameter of countershaft gear 94, The design of FIG. 2b requires less space than the design of FIG. 2a because of the absence of planetary gearing on the countershaft. This increases the possibility for improved packaging of the transmission in a vehicle powertrain.

During the shift, in the case of FIGS. 2, 2a and 2b, motor torque fills any "torque hole" in the engine torque flow path. Thus, the shift is done at a point when there is reserve motor torque.

Figure 3:
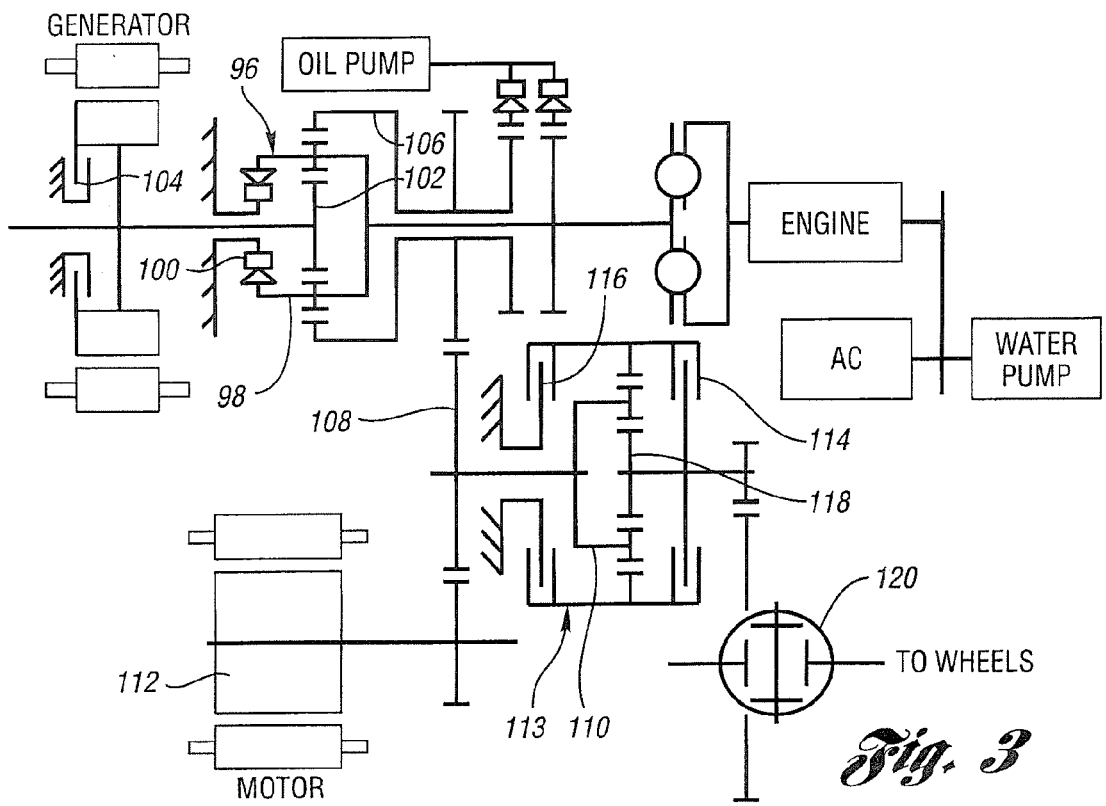
FIG. 3 is a schematic representation of a gearing arrangement similar to the gearing arrangement of FIG. 2a, but the power flow path for the motor has two ratios.

In the embodiment of FIG. 3, the power flow path for both the motor and the engine can be shifted. In this respect, it differs from the embodiments shown in FIGS. 2, 2a and 2b. In the embodiment of FIG. 3, a first planetary gear unit 96 is comparable to the planetary gear unit 48 of the arrangement shown in FIG. 2. In the case of FIG. 3, the carrier 98 is braked by overrunning coupling 100. Sun gear 102 of gear unit 96 is braked by generator brake 104 to establish a first gear ratio as torque is delivered from ring gear 106 to countershaft gear 108, which drives the carrier 110 of second planetary gear unit 113. When the motor 112 is acting as a power source, carrier 110 is driven by the motor and the output gear of the planetary gear unit 113 is the sun gear 118, which drives the differential-and-axle assembly 120.

The gear ratio for the planetary gear unit 113 can be shifted to a ratio of unity by engaging clutch 114. Reaction brake 116, when the clutch 114 is disengaged, supplies a reaction point for the gear unit 113. Thus, in the case of FIG. 3, both the power flow path for the motor and the power flow path for the engine can be shifted between two driving ratios, thereby providing additional flexibility to the powertrain.

Figure 3A:
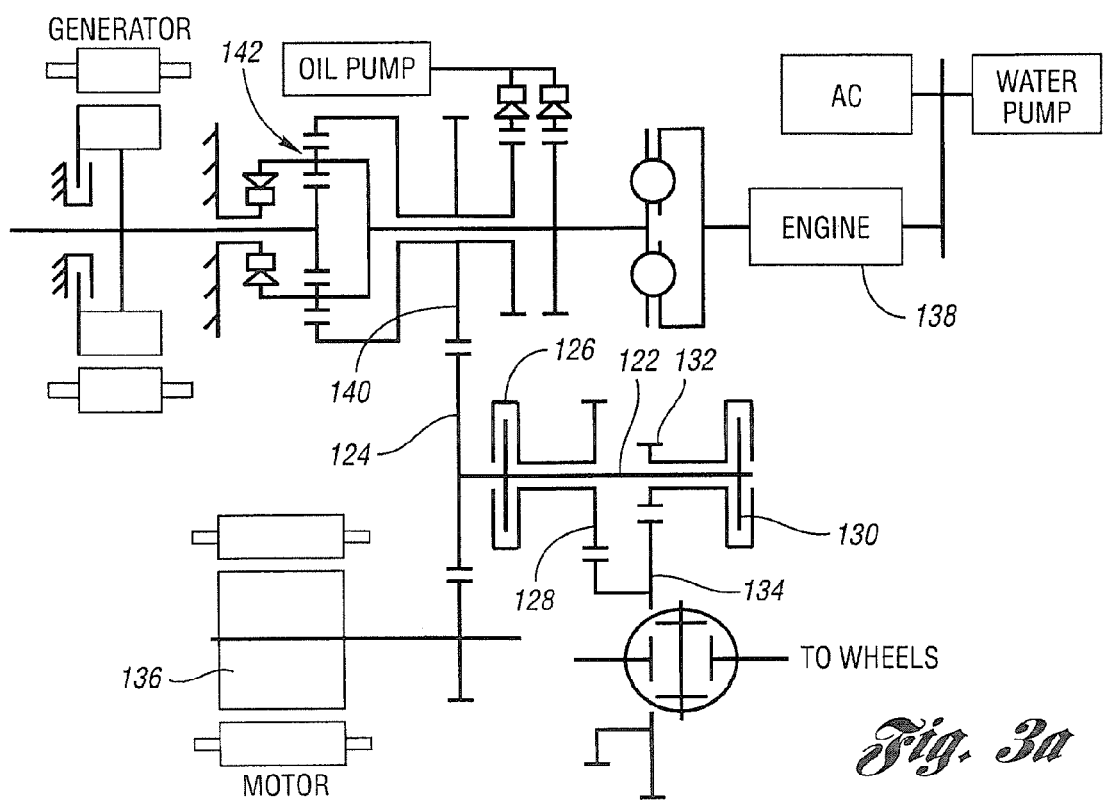
FIG. 3a is a schematic representation of a gearing arrangement with an added multiple ratio torque output gear.

In the embodiment of FIG. 3a, it is possible to provide two ratios without the need for a second planetary gear set on the countershaft axis. The portion of the gear arrangement of FIG. 3a on the engine axis is similar to the gear arrangement of FIG. 2a. The arrangement of FIG. 3a is similar also to the arrangement of FIG. 3 because it makes available two ratios for the output gear. Unlike the arrangement of FIG. 3, however, the two ratios for the output gear are achieved without the need for a planetary gear unit on the countershaft axis.

In the arrangement of FIG. 3a, a countershaft 122 is connected to countershaft gear 124.

In FIG. 3a, countershaft gear 124 can be selectively connected to the countershaft gear 128 by clutch 126. This establishes a first gear ratio. A second countershaft clutch 130 can be engaged to establish a driving connection between a smaller diameter countershaft gear 132 and the differential-and-axle gear 134. Motor power from motor 136 is delivered through the countershaft 122 through either clutch 126 or 130. Likewise, the power flow path from the engine delivers torque to countershaft gear 124 and that torque, in turn, is delivered through either clutch 126 or clutch 130 to the traction wheels. Thus, the engine torque is delivered through the same torque flow path as motor torque. Both the engine and the motor have the same two ratios. In order to shift ratios in the power flow paths, the engagement and release of clutches 126 and 130 must be synchronized to avoid a torque reduction at the wheels.

As in the case of the previous embodiments, engine 138 drives torque transfer gear 140 as torque is delivered through planetary gear unit 142 located on the engine axis.

Figure 3B:
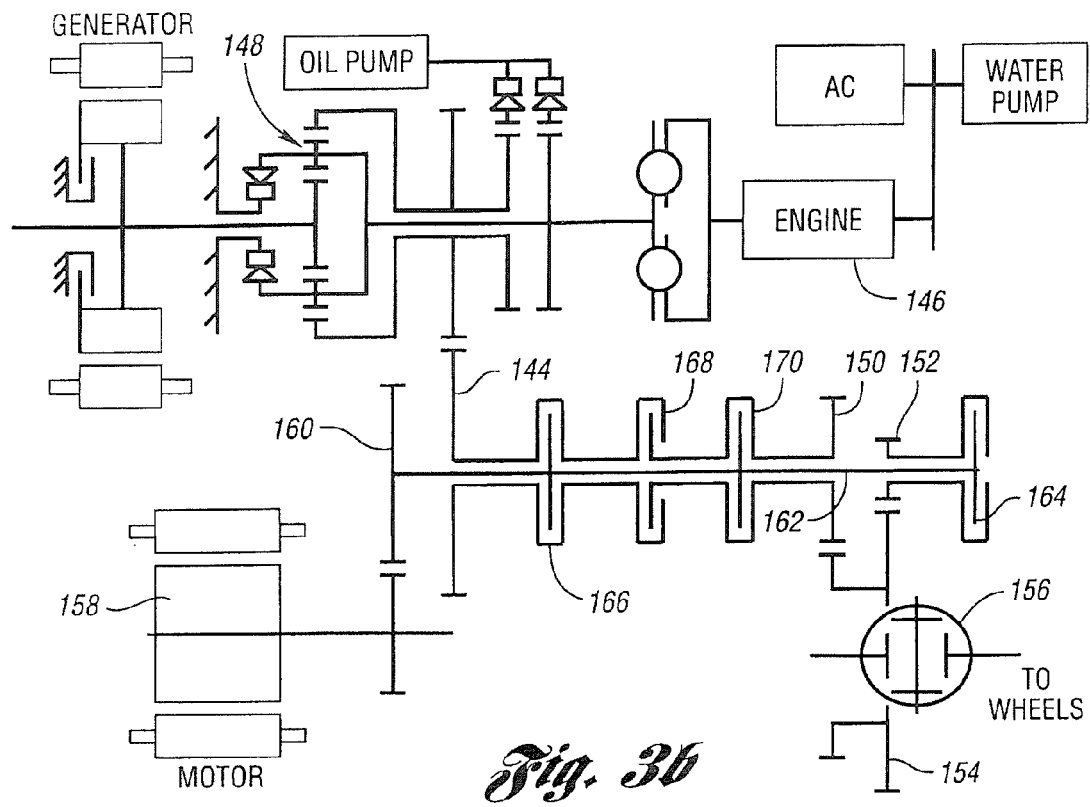
FIG. 3b is a schematic representation of a gearing arrangement having an additional multiple ratio torque output gear with multiple clutches to achieve smooth shifts.

In the embodiment of FIG. 3b, the kinematics involved are similar to the kinematics involved in the arrangement of FIG. 3a. In the case of the arrangement of FIG. 3b, engine power is delivered to countershaft gear 144 from engine 146 through the planetary gear unit 148. Countershaft gear 150 and a smaller diameter countershaft gear 152 each drive a differential carrier gear 154 of the differential-and-axle assembly 156. Motor power from motor 158 drives countershaft gear 160, which drives countershaft 162. Countershaft 162 is connected to the differential-and-axle assembly 156 through selectively engageable clutches 164 and 170. Engine power can be delivered to the countershaft 162 through selectively engageable clutch 166. If countershaft clutch 168 is engaged, engine power can be delivered to countershaft gear 150.

With the arrangement shown in FIG. 3b, the gear ratio in the power flow path between the engine and the wheels can be changed independently of the gear ratio in the power flow path between the motor and the wheels. Thus, the motor can provide torque to the wheels during a ratio shift in the engine torque flow path and the engine can deliver torque to the wheels during a ratio shift in the motor torque flow path. Smoother ratio shifts then can be achieved because one power source can provide torque during a shift interval that occurs in the power flow path for the other power source.

In a launch mode, clutch 164 would be closed and clutch 166 would be closed. When a shift is desired, clutch 166 is opened and clutch 168 is closed, which would cause engine power to flow through the new ratio and motor power to flow through the old ratio. If clutch 164 would be opened and clutch 170 would be closed, the motor power flow path would shift to the new ratio.

Another advantage of the gear arrangement of FIG. 3b, which is true also of the gear arrangements of FIGS. 3 and 3a, is that the vehicle is capable of having a true neutral gear. That is, the motor and the engine can be completely disconnected from the driveshaft by disengaging the clutches in the power flow path between the wheels and each power source. This feature has advantages during operation of an automatic brake system and during hard-braking events for the vehicle because the overall powertrain inertia that must be overcome by the friction elements of the braking system is reduced as the transmission rapidly cycles into and out of the neutral state during a braking event.

Figure 3C:
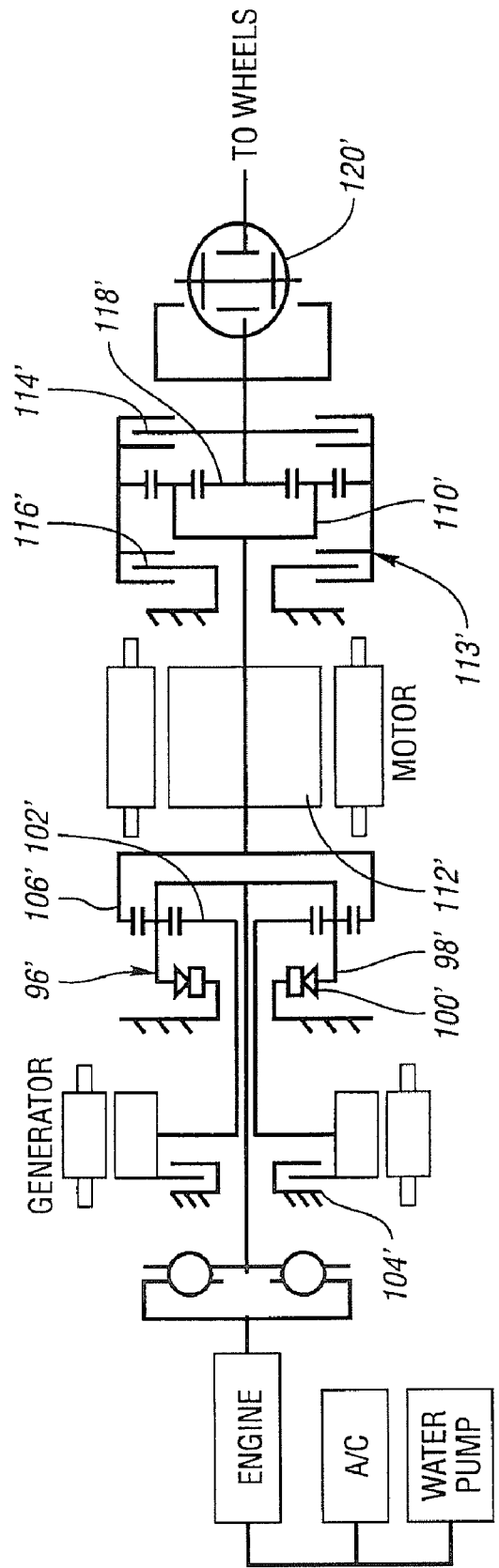
FIG. 3c is a schematic representation of a gearing arrangement for a rear wheel drive vehicle.

The embodiment of the invention shown in FIG. 3c is intended for rear wheel drive vehicles. It includes elements that correspond to elements in the embodiment of FIG. 3. The elements in FIG. 3c that have a counterpart in the embodiment of FIG. 3 are identified by the same reference numerals, although prime notations are used with the numerals in FIG. 3c.

The planetary gear unit 113' of FIG. 3c is located on a common axis for the motor 112' and the engine, rather than on a countershaft axis as in the case of the gearing of FIG. 3. In FIG. 3c the motor 112' is directly connected to carrier 110', whereas the motor 112 of FIG. 3 is connected to carrier 110 through countershaft gearing 108.

Figure 4:
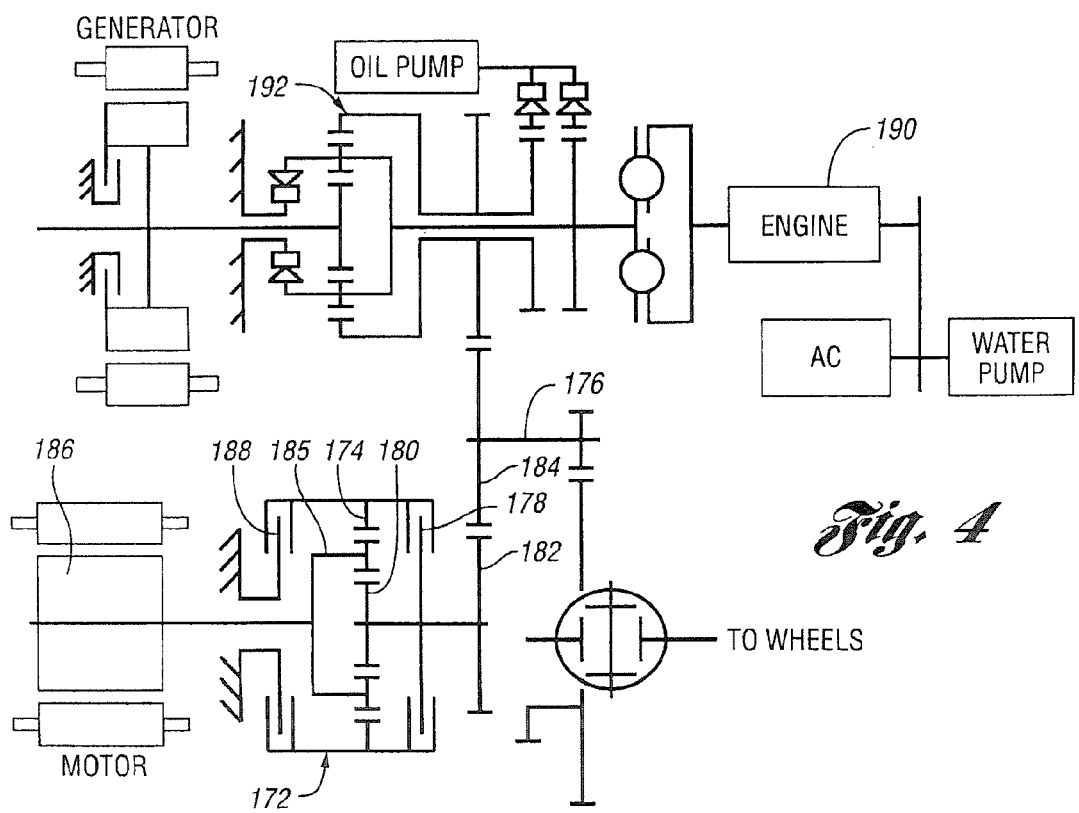
FIG. 4 is a schematic representation of a gearing arrangement having a planetary gear set on the axis of the motor.

In the embodiment of FIG. 4, a gearing arrangement is illustrated wherein an added gear unit for the motor is used on the motor axis, as indicated at 172. The gear unit 172 is a planetary gear unit with a ring gear 174 that can be drivably connected to countershaft 176 when clutch 178 is engaged. Sun gear 180 is connected directly to gear 182, which drives countershaft gear 184. The motor 186 drives the carrier 185 of the planetary gear unit 172, and selectively engageable brake 188 anchors ring gear 174 to establish a gear ratio through the planetary gear unit 172 with the clutch 178 released. When the clutch 178 is applied and the brake 188 is released, the gear ratio at the planetary gear unit 172 is unity. Clutch 178 and brake 188 define a clutch and brake friction element sub-assembly.

In the case of the gear arrangement of FIG. 4, only the power flow path for the motor can be shifted. The power flow path for the engine cannot be shifted. The split of power between the generator drive and the engine drive, as in the case of the previous embodiments, is achieved by planetary gear unit 192.

In the gearing arrangement of FIG. 4, the electric motor is connected through the planetary gear unit 172 to the traction wheels. The planetary gear units 172 and 192 are arranged such that by engaging brake 188, a default gear ratio of around 3:1 to 4:1 is achieved. This gives the required launching torque at the wheels. At highway cruising speeds, the brake 188 is disengaged and clutch 178 is engaged, which results in a gear ratio of 1:1. Thus, the maximum vehicle speed can be increased. Also, motor operation in the most efficient speed range can be chosen, thereby further improving fuel economy. Clutch 178 and brake 188 define a clutch and brake friction element sub-assembly.

Figure 5:
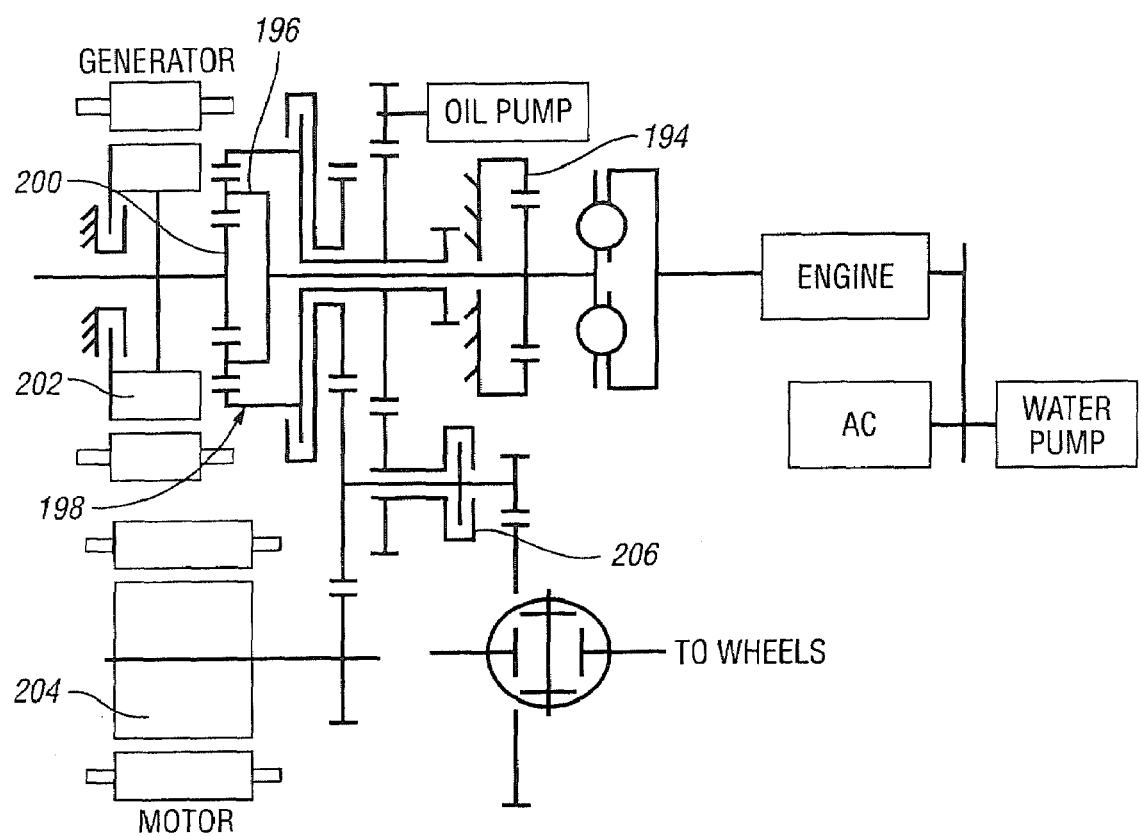
FIG. 5 is a schematic representation of a gearing arrangement in which a reaction brake is used on the engine while a generator delivers torque through a planetary gear unit to the traction wheels in an alternate drive mode, the motor delivering torque to the traction wheels during reverse drive.

In the embodiment of FIG. 5, the gearing elements are arranged in a manner similar to the gearing arrangement of FIG. 2b. In the case of the design of FIG. 5, however, an extra brake 194 can be applied to anchor the engine crankshaft and to provide a reaction point for the carrier 196 of a planetary gear unit 198. The sun gear 200 of the gear unit 198 is adapted to be driven by the rotor 202 of the generator. With the carrier 196 braked and with the engine disabled, a generator drive is established when the engine is non-functional. It also provides both forward drive and reverse. The motor 204 is drivably connected to the wheels through selectively engageable countershaft clutch 206 to achieve reverse drive during such alternate drive modes.

In FIG. 5, the brake 194 is open during forward drive operation, but it is closed in reverse drive operation. It is used also to provide reaction torque as the generator develops torque in the reverse direction. Thus, the generator can augment motor torque during reverse drive if that is desired. The same amount of power then can be transmitted, during operation in an alternate mode, to the wheels in both forward and reverse drive.

In selecting the ratios during a shift in the gearing arrangements of the invention, the overall system efficiency is achieved by choosing the appropriate generator and engine end-points. The shift between the two ratios is performed with hysteresis, which is required for desired drivability. The shift can be done either synchronously or non-synchronously.

Engine starting during normal operating conditions is done by spinning the generator to start the engine. The clutch "break-torque" is set so that the shock at the traction wheels during engine start is minimized while providing enough reaction torque for engine starting. The additional pressure at the clutch that is needed is provided by the engine-driven pump, which facilitates engine torque transfer to the wheels by providing added torque reaction. This is true of a default-closed high gear clutch.

In the case of a default-open clutch, engine starting can be done by modulating the pressure on the high ratio clutch to achieve full torque transfer.

The ratio shift from low to high can be scheduled at a higher vehicle speed than the electric drive speed so that the appropriate gear is set before the engine is shut-down. The high ratio clutch torque is adjusted to ensure a smooth engine shut-down by opening both clutches.

If the vehicle has traction control or automatic brake system control, powertrain inertia is reduced as much as possible by the gearing arrangements of the invention during traction control events and automatic braking events. The reduced inertia also accommodates energy dissipation and reduces shock during these events.

During cold starts, in park, the high ratio clutch or the low ratio clutch can be opened, which permits the generator to be spun to a high speed. Then the clutch can be closed to provide starting inertia torque. This is a useful technique if the battery state-of-charge is low.

Although embodiments of the invention have been described, it will be apparent that modifications may be made by persons skilled in the art without departing from the scope of the invention. All such modifications and equivalents thereof are intended to be covered by the following claims.

What is claimed is:

1. A powertrain for a hybrid electric vehicle having an engine, an electric generator and an electric motor acting as a pair of drive power sources for driving vehicle traction wheels, the powertrain comprising:

gear elements drivably connecting the pair of power sources to the traction wheels through first and second geared power flow paths, at least one geared power flow path having at least two gear ratios;

one of the pair of drive power sources being connected by the gear elements to the traction wheels through the first geared power flow path;

the first geared power flow path comprising a first planetary gear unit, the first planetary gear unit having a sun gear connected to the generator, a carrier connected to the engine and a ring gear connected drivably to one gear element of a second planetary gear unit;

the engine defining one power source on an engine axis and the motor defining in part another power source on a motor axis; and a friction element sub-assembly for the second planetary gear unit establishing selectively each of the gear ratios;

the motor being connected drivably to the traction wheels through fixed ratio gear elements and a second gear element of the second planetary gear unit being connected drivably to the traction wheels to complement motor driving power.

2. The powertrain set forth in claim 1 wherein the first planetary gear unit is disposed on the engine axis and the second planetary gear unit is disposed on an axis that is offset from and parallel to the engine axis.

3. A powertrain for a hybrid electric vehicle having an engine, an electric generator and an electric motor acting as a pair of drive power sources for driving vehicle traction wheels, the powertrain comprising:

gear elements drivably connecting the pair of power sources to the traction wheels through first and second geared power flow paths, at least one geared power flow path having at least two gear ratios;

one of the pair of drive power sources being connected by the gear elements to the traction wheels through the first geared power flow path;

the first geared power flow path comprising a first planetary gear unit, the first planetary gear unit having a sun gear connected to the generator, a carrier connected to the engine and a ring gear connected drivably to a second planetary gear unit;

the engine defining one power source on an engine axis and the motor defining in part another power source on a motor axis common to the engine axis;

a friction element sub-assembly for the second planetary gear unit establishing selectively each of the gear ratios; and the motor being connected drivably to the traction wheels through the second planetary gear unit, the engine being connected drivably to the traction wheels to complement motor driving power;

wherein the first planetary gear unit and the second planetary gear unit are disposed on the common axis for the motor and the engine axis.

4. The powertrain set forth in claim 3 wherein the vehicle traction wheels are rear traction wheels, the gear elements defining a rear wheel drive powertrain configuration.

5. A powertrain for a hybrid electric vehicle having an engine, an electric generator and an electric motor, the powertrain comprising:
a first planetary gear unit on an axis that is common to an engine axis, the engine being connected drivably to a torque input element of the first planetary gear unit;
a second planetary gear unit on a countershaft axis spaced from and parallel to both the engine axis and an electric motor axis, a torque output element of the second planetary gear element being connected drivably to vehicle traction wheels;
a torque input element of the second planetary gear unit being connected drivably to the motor and a torque output element of the first planetary gear unit; and
a friction element sub-assembly for establishing and disestablishing each of two gear ratios in the second gear unit, whereby a ratio change occurs in power flow paths for the motor and the engine.

6. A powertrain for a hybrid electric vehicle having an engine, an electric generator, and an electric motor, the powertrain comprising:
a planetary gear unit on an engine axis, the engine being connected drivably to a first element of the planetary gear unit, the generator being connected drivably to a second element of the planetary gear unit;
two countershaft gear elements mounted on a countershaft axis spaced from and parallel to a motor axis and the engine axis;
a countershaft clutch assembly for establishing and disestablishing each of two gear ratios in the countershaft gearing;
the countershaft clutch assembly selectively connecting each countershaft gear element to vehicle traction wheels, the motor being drivably connected through the countershaft clutch assembly to the countershaft gear elements; and
a torque output element of the planetary gear unit being drivably connected to the countershaft gear elements through the countershaft clutch assembly.

7. A powertrain for a hybrid electric vehicle having an engine, an electric generator, and an electric motor, the powertrain comprising:
a planetary gear unit on an engine axis;
the engine being connected drivably to a first element of the planetary gear unit, the generator being connected drivably to a second element of the planetary gear unit;
countershaft gearing comprising at least two countershaft gear elements mounted on a countershaft axis spaced from and parallel to a motor axis and the engine axis;
countershaft clutches for selectively connecting each of the countershaft gear elements to vehicle traction wheels;
the motor being drivably connected through the countershaft clutches to the countershaft gears; and
a torque output element of the planetary gear unit being drivably connected to the counter shaft gearing through the countershaft clutches.

8. The powertrain set forth in claim 7 wherein the countershaft clutches comprise multiple clutch elements in each of two power flow paths from the engine and the motor, whereby engine power is available to complement motor power during a gear ratio change in the power flow path for the motor and motor power is available to complement engine power during a gear ratio change in the power flow path for the engine, thus effecting smooth gear ratio changes in the powertrain.

9. A powertrain for a hybrid electric vehicle having an engine, an electric generator and an electric motor, the powertrain comprising:
a first planetary gear unit on an axis that is common to an engine axis, the engine being connected drivably to a torque input element of the first planetary gear unit, the first planetary gear unit defining a first power flow path for the engine for driving vehicle traction wheels; and
a second planetary gear unit with a friction element sub-assembly for establishing and disestablishing each of two gear ratios in a second power flow path for the motor for driving the vehicle traction wheels.

10. The powertrain set forth in claim 9 wherein the vehicle is a rear wheel drive vehicle, the geared connection defining the second power flow path being disposed on an axis that is common to axes for the engine and the motor.

11. The powertrain set forth in claim 9 wherein the second planetary gear unit is located on a countershaft axis spaced from and parallel to the engine axis and a motor axis.

12. The powertrain set forth in claim 9 wherein the second planetary gear unit is located on a motor axis spaced from and parallel to the engine axis.

13. The powertrain set forth in claim 12 including countershaft gearing forming in part the first and second power flow paths.

14. A powertrain for a hybrid electric vehicle having an engine, an electric generator and an electric motor, the powertrain comprising:
a first planetary gear unit on an axis that is common to an engine axis, the engine being connected drivably to a first element of the first planetary gear unit,
the electric generator being connected to a second element of the first planetary gear unit, a third element of the first planetary gear unit being drivably connected to vehicle traction wheels;
the first planetary gear unit defining a first power flow path for the engine for driving the vehicle traction wheels; and
a second planetary gear sub-assembly for establishing and disestablishing each of two gear ratios in a second power flow path for the motor for driving the vehicle traction wheels.

15. The powertrain set forth in claim 14 wherein the first element of the first planetary gear unit is a planetary carrier, the second element of the first planetary gear unit is a sun gear and the third element of the first planetary gear unit is a ring gear.

* * * * *